United States Patent
Naito et al.

(10) Patent No.: US 8,992,844 B2
(45) Date of Patent: Mar. 31, 2015

(54) LEAN NOX TYPE EXHAUST GAS PURIFYING CATALYST

(75) Inventors: Tetsuro Naito, Yokohama (JP); Yasunari Hanaki, Yokohama (JP); Masanori Nakamura, Yokosuka (JP); Masato Nagata, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 150 days.

(21) Appl. No.: 13/821,520

(22) PCT Filed: Mar. 6, 2012

(86) PCT No.: PCT/JP2012/055655
§ 371 (c)(1),
(2), (4) Date: Mar. 7, 2013

(87) PCT Pub. No.: WO2012/147411
PCT Pub. Date: Nov. 1, 2012

(65) Prior Publication Data
US 2013/0177484 A1      Jul. 11, 2013

(30) Foreign Application Priority Data
Apr. 28, 2011 (JP) .................... 2011-100747

(51) Int. Cl.
*B01D 50/00* (2006.01)
*B01D 53/94* (2006.01)
(Continued)

(52) U.S. Cl.
CPC ........ *B01D 53/9413* (2013.01); *B01D 53/9422* (2013.01); *B01D 53/9431* (2013.01); *B01D 53/944* (2013.01); *B01D 53/9445* (2013.01); *B01D 53/9477* (2013.01); *B01D 2255/1021* (2013.01); *B01D 2255/1023* (2013.01); *B01D 2255/1025* (2013.01); *B01D 2255/202* (2013.01); *B01D 2255/2022* (2013.01); *B01D 2255/2027* (2013.01); *B01D 2255/2042* (2013.01); *B01D 2255/2065* (2013.01); *B01D 2255/20715* (2013.01);
(Continued)

(58) Field of Classification Search
USPC .................................................. 422/177, 180
See application file for complete search history.

(56) References Cited

U.S. PATENT DOCUMENTS

2004/0052699 A1*   3/2004 Molinier et al. .............. 422/180

FOREIGN PATENT DOCUMENTS

| EP | 1064985 A1 | 1/2001 |
|----|-----------|--------|
| EP | 2098292 A1 | 9/2009 |

(Continued)

OTHER PUBLICATIONS

An English translation of the Chinese Office Action for the corresponding Chinese patent application No. 201280004813.7 issued on Jul. 15, 2014.

(Continued)

*Primary Examiner* — Tom Duong
(74) *Attorney, Agent, or Firm* — Global IP Counselors, LLP

(57) ABSTRACT

A lean NOx trap type exhaust gas purifying catalyst having a catalyst noble metal selected from a group consisting of platinum, palladium and rhodium, an inorganic oxide that carries the catalyst noble metal, and at least one NOx adsorbent one selected from a group of magnesium, barium, sodium, potassium and cesium. The inorganic oxide carrying palladium containing cerium in a CeO2-equivalent quantity in a range of 1 to 20 wt %, and at least one of aluminum and zirconium.

4 Claims, 1 Drawing Sheet

(51) Int. Cl.
  *B01J 23/58* (2006.01)
  *B01J 23/63* (2006.01)
  *F01N 3/08* (2006.01)

(52) U.S. Cl.
  CPC .... *B01D 2255/2092* (2013.01); *B01D 2255/91* (2013.01); *B01J 23/58* (2013.01); *B01J 23/63* (2013.01); *F01N 3/0842* (2013.01); *F01N 2370/00* (2013.01); *Y02T 10/22* (2013.01)
  USPC .......................................................... 422/177

(56) References Cited

FOREIGN PATENT DOCUMENTS

| | | |
|---|---|---|
| EP | 2308593 A1 | 4/2011 |
| JP | 2004-351243 A | 12/2004 |
| JP | 2007-530271 A | 11/2007 |
| JP | 2009-297616 A | 12/2009 |
| JP | 2010-242602 A | 10/2010 |

OTHER PUBLICATIONS

The Extended European Search Report for the corresponding European patent application No. 12776289.6 issued on Jan. 26, 2015.

An English translation of the Chinese Office Action for the corresponding Chinese Application No. 201280004813.7 issued on Dec. 26, 2014.

An English translation of the Japanese Office Action for the corresponding Japanese Application No. 2011-100747 issued on Jan. 5, 2015.

An English translation of the Russian Office Action for the corresponding Russian Application No. 2013113950/04 (020615) issued on Dec. 12, 2014.

\* cited by examiner

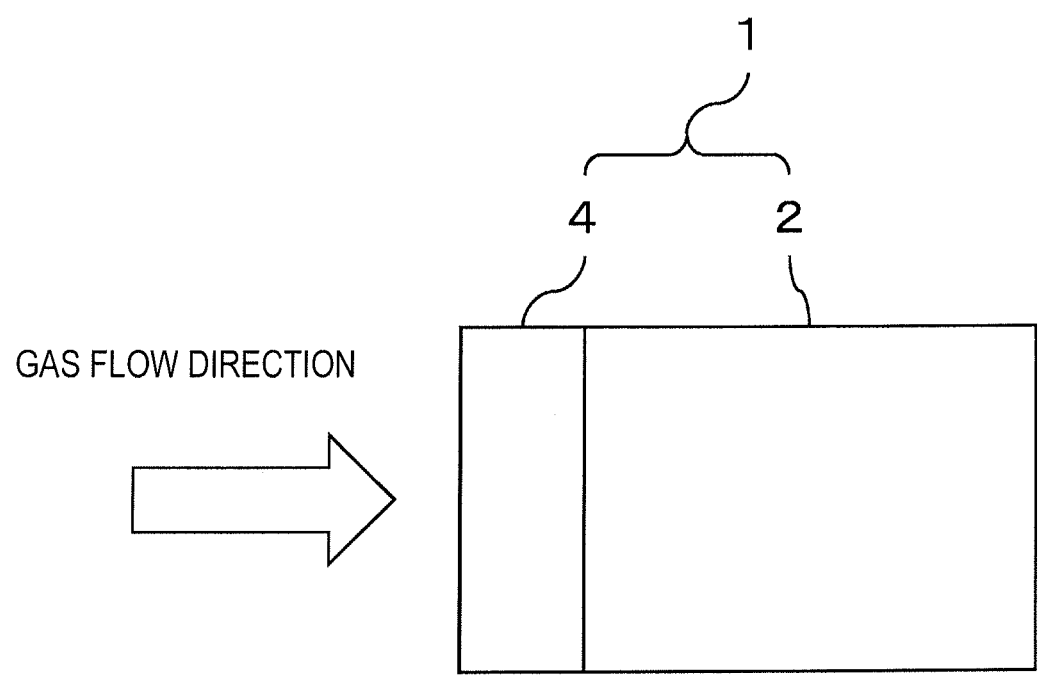

LEAN NOX TYPE EXHAUST GAS PURIFYING CATALYST

CROSS-REFERENCE TO RELATED APPLICATIONS

This application is a U.S. National stage application of International Application No. PCT/JP2012/055655, filed Mar. 6, 2012, which claims priority under to Japanese Patent Application No. 2011-100747, filed in Japan on Apr. 28, 2011, the entire contents of which is hereby incorporated by reference.

BACKGROUND

1. Field of the Invention

The present invention relates to a lean NOx trap type exhaust gas purifying catalyst and an exhaust gas cleaning system.

More specifically, the present invention relates to a lean NOx trap type exhaust gas purifying catalyst with excellent durability, and an exhaust gas cleaning system equipped with this exhaust gas purifying catalyst.

2. Background Information

In the prior art, there have been proposed an exhaust gas purifying catalyst that adsorbs NOx to a NOx adsorbent in a lean atmosphere, and releases the NOx from the stoichiometric mixture or a rich atmosphere for reductive cleaning. More specifically, the exhaust gas purifying catalyst is a mixture of a first powder prepared by carrying platinum on a first carrier made of porous grains and a second powder prepared by carrying rhodium on a second carrier. Here, the NOx adsorbent is carried on the first carrier described above, and the second carrier described above is made of zirconia stabilized by alkaline earth metal or rare earth element (excluding cerium) (see Japanese Patent No. 3741303).

SUMMARY

However, the exhaust gas purifying catalyst described in the Patent Document 1 listed above fails to have sufficiently high durability, which is undesirable.

The present invention is made to address the problems of the prior art described above.

The purpose of the present invention is to provide a lean NOx trap type exhaust gas purifying catalyst with excellent durability, and an exhaust gas cleaning system equipped with this exhaust gas purifying catalyst.

In order to realize the purpose, the present inventors have carried out extensive studies. As a result of the studies, it was found that the purpose can be realized by containing palladium or other catalyst noble metal, an inorganic oxide that carries the catalyst noble metal, and a prescribed NOx adsorbent, and by having a prescribed composition for the inorganic oxide that carries palladium. As a result, the present invention was reached.

That is, the lean NOx trap type exhaust gas purifying catalyst of the present invention contains platinum, palladium and rhodium as the catalyst noble metals, an inorganic oxide that carries the catalyst noble metals, and a NOx adsorbent made of magnesium, barium, sodium, potassium, or cerium or any of their combinations. Among the inorganic oxides, the inorganic oxide carrying palladium contains cerium and aluminum and/or zirconium. The inorganic oxide carrying palladium contains cerium in a $CeO_2$-equivalent quantity of 1 to 20 wt %.

The exhaust gas cleaning system of the present invention comprises the lean NOx trap type exhaust gas purifying catalyst and another catalyst containing the catalyst noble metal and located on the upstream side from the lean NOx trap type exhaust gas purifying catalyst with respect to the exhaust gas flow direction.

The present invention has the following listed configuration features (1) to (3), so as to provide a lean NOx trap type exhaust gas purifying catalyst with excellent durability and an exhaust gas cleaning system equipped with this exhaust gas purifying catalyst (1) This NOx trap type exhaust gas purifying catalyst contains platinum, palladium and rhodium as the catalyst noble metals, an inorganic oxide that carries the catalyst noble metals, and a NOx adsorbent made of magnesium, barium, sodium, potassium, or cerium or any of their combinations.

(2) Among the inorganic oxides, the inorganic oxide carrying palladium contains cerium and aluminum and/or zirconium.

(3) The inorganic oxide carrying palladium contains cerium in a $CeO_2$-equivalent quantity of 1 to 20 wt %.

BRIEF DESCRIPTION OF THE DRAWINGS

Referring now to the attached drawing which forms a part of this original disclosure.

FIG. 1 is a schematic diagram illustrating the configuration of the exhaust gas cleaning system related to an embodiment of the present invention.

DETAILED DESCRIPTION OF THE EMBODIMENTS

In the following, the lean NOx trap type exhaust gas purifying catalyst and the exhaust gas cleaning system equipped with this exhaust gas purifying catalyst will be explained in detail.

First of all, the lean NOx trap type exhaust gas purifying catalyst related to an embodiment of the present invention will be explained in detail.

The lean NOx trap type exhaust gas purifying catalyst of this embodiment contains a catalyst noble metal, an inorganic oxide carrying the catalyst noble metal, and a NOx adsorbent. Here, the catalyst noble metal refers to that containing at least platinum (Pt), palladium (Pd) and rhodium (Rd). However, other catalyst noble metals may also be included. The NOx adsorbent refers to a NOx adsorbent containing magnesium (Mg), barium (Ba), sodium (Na), potassium (K) or cesium (Cs) as well as any their combination. However, other NOx adsorbents may also be included.

It is preferred that barium (Ba) or cesium (Cs) be adopted as they can further improve the durability. The inorganic oxide carrying palladium (Pd) among the inorganic oxides contains cerium (Ce) and/or alumina (Al) and zirconium (Zr). Here, the inorganic oxide carrying palladium (Pd) contains cerium (Ce) in a $CeO_2$-equivalent quantity in the range of 1 to 20 wt %.

With such configuration, coagulation of the catalyst noble metal can be suppressed, so as to have excellent durability. In addition, platinum (Pt) is replaced by the inexpensive palladium (Pd), and, at the same time, durability can be improved, so that the cost of the catalyst can be cut. These are advantages.

The lean NOx trap type exhaust gas purifying catalyst of the present embodiment can be used in the pellet shape as is. However, in order to increase the contact rate with HCl, as well as CO, NOx in the exhaust gas, one may also adopt a type with a catalyst layer containing the lean NOx trap type exhaust gas purifying catalyst formed on a honeycomb carrier.

As the honeycomb carrier, for example, the type made of ceramics, such as cordierite, silicon carbide, etc., and the type made of metals, such as ferrite type stainless steel, etc. may be adopted.

Usually, it is believed that coagulation of the catalyst noble metal is caused by the mechanisms of the following: (1) the catalyst noble metal coagulates by heat or the like on the inorganic oxide as the carrying substrate, and (2) the inorganic oxide itself as the carrying substrate itself coagulates due to heat or the like, so that the catalyst noble metal present on the carrying substrate coagulates together therewith.

For example, when alumina ($Al_2O_3$) or zirconia ($ZrO_2$) is adopted as the carrying substrate, coagulation makes progress due to the mechanism of (2) listed above. On the other hand, according to the present invention, the inorganic oxide contains cerium (Ce) and/or alumina (Al) and zirconium (Zr). The content represented by the $CeO_2$-equivalent quantity is in the range of 1 to 20 wt %. As a result, coagulation of the inorganic oxide as the carrying substrate itself can be suppressed. As a result, even after a long time, an excellent catalyst performance can be maintained.

Cerium present in the inorganic oxide works as an oxygen releasing substance (OSC substance). Consequently, when cerium is contained in the catalyst, there exists a certain optimum range.

According to the present embodiment, if the content of cerium represented by the $CeO_2$-equivalent quantity is less than 1 wt %, variation in the atmosphere cannot be reduced, so that the catalyst performance degrades. On the other hand, according to the present embodiment, if the content of cerium represented by the $CeO_2$-equivalent quantity is over 20 wt %, the reducing agent needed for reducing NOx cannot be used in NOx reduction in the case of rich spike (simple oxidation of the reducing agent by oxygen released from the OSC substance takes place). This is undesirable.

In consideration of these viewpoints, the inorganic oxide is preferred to contain cerium and aluminum and/or zirconium, with the cerium content represented by the $CeO_2$-equivalent quantity in the range of 1 to 5 wt %. However, the mechanism described above is based on estimation only. Consequently, even when the effects described above can be realized by a certain mechanism other than the mechanism described above, it is still considered to be within the range of the present invention.

For the lean NOx trap type exhaust gas purifying catalyst of the present embodiment, the inorganic oxide carrying palladium (Pd) is preferred to have a surface area maintainability over 50% when the inorganic oxide is sintered at 900° C. for 3 h.

As explained above, the inorganic oxide as a carrying substrate itself is preferred to be hardly coagulated. In particular, with the inorganic oxide with a surface area maintainability of 50% or higher after sintering at 900° C. for 3 h, coagulation of the catalyst noble metal on the carrying substrate can significantly be suppressed. Consequently, the lean NOx trap type exhaust gas purifying catalyst with this configuration can display even better durability. Of course, the inorganic oxide carrying platinum (Pt) or rhodium (Rh) is preferred to also be of the type hardly coagulated. However, it is not required to be of the same type.

The catalyst function's mechanism of the lean NOx trap type exhaust gas purifying catalyst is believed to be as follows. First of all, the catalyst has the NO mainly exhausted in the lean atmosphere oxidized to $NO_2$ on the catalyst noble metal, followed by adsorption by the barium (Ba) or other NOx adsorbent. Then, when the adsorption quantity in the NOx adsorbent becomes near saturation, under the engine control, the atmosphere near the catalyst becomes a rich atmosphere. As a result, the catalyst has the NOx adsorbed in the NOx adsorbent detached therefrom and then make reaction with HC, CO, $H_2$ or other reducing agent on the catalyst noble metal, so that NOx is cleaned. For the catalyst containing only the conventional Pt, Rh, it is believed that oxidation from NO to NOx is mostly carried out on Pt. When Pd is compared with Pt, due to a lower oxidation power, when Pd is used in place of Pt, the oxidation reaction from NO to NOx can hardly make progress, so that the cleaning ability for NOx becomes lower. However, the mechanism described above is based on estimation only. Consequently, even when the effects described above can be realized by a certain mechanism other than the mechanism described above, it is still considered to be within the range of the present invention.

In addition, for the lean NOx trap type exhaust gas purifying catalyst of the present embodiment, cerium is preferred to be included in the $CeO_2$-equivalent quantity of 20 wt % or less with respect to the total quantity of the catalyst. If the quantity of the OSC substance in the total quantity of the catalyst is over 20 wt %, the simple oxidation of the reducing agent makes progress by the oxygen released from the OSC substance, so that the rich spike cannot be efficiently used in the NOx cleaning.

In the following, the exhaust gas cleaning system related to an embodiment of the present invention will be explained in detail with reference to figures. FIG. 1 is a schematic diagram illustrating the configuration of the exhaust gas cleaning system related to an embodiment of the present invention. As shown in FIG. 1, the exhaust gas cleaning system 1 in this embodiment has a lean NOx trap type exhaust gas purifying catalytic converter 2 related to an embodiment of the present invention as described above, and another catalytic converter 4 located on the upstream side from the lean NOx trap type exhaust gas purifying catalytic converter 2 with respect to the exhaust gas flow direction. Although not shown in the figure, the another catalytic converter contains the catalyst noble metal. Typical examples of another catalytic converter are three way catalytic converters and three way catalytic converters for diesel engine, etc.

As the lean NOx trap type exhaust gas purifying catalytic converter is arranged on the downstream side from the three way catalytic converter, three way catalytic converters for diesel engine, or other three way catalytic converters, cleaning for HC, CO and NOx exhausted in a high rate can be realized when the engine is started, and an even better durability can be realized.

For the exhaust gas cleaning system in the present embodiment, the ratio by mass of the quantity of the catalyst noble metal in the lean NOx trap type exhaust gas purifying catalyst to that of the catalyst noble metal in the other catalyst is preferably in the range of 1 to 1.6.

The purpose for arranging the three way catalytic converters, oxidation catalytic converters for diesel engine, or other catalyst is for cleaning HC, CO in the low temperature region (when engine starts), and the purpose for arranging the lean NOx trap type exhaust gas purifying catalyst is for cleaning NOx. When the quantity of the noble metal contained in the three way catalytic converters or the oxidation catalytic converters for diesel engine is increased, although the cleaning rate for HC, CO in the low temperature region can be increased, the cleaning rate for NOx by the lean NOx trap type exhaust gas purifying catalyst nevertheless decreases as an opposite trend. It is believed that the cause for this phenomenon is as follows: when the quantity of the noble metal contained in the three way catalytic converters or the oxidation catalytic converters for diesel engine is increased, in the case of the rich spike, the quantity of the reducing agent for NOx, such as HC, CO, etc., flowing into the lean NOx trap type exhaust gas purifying catalyst decreases, and the reducing agent needed for cleaning Nox cannot be supplied. Consequently, by controlling the quantity of the noble metal in the three way catalytic converters or the oxidation catalytic converters for diesel engine and in the lean NOx trap type exhaust gas purifying catalytic converter, the cleaning rate for HC, CO and the cleaning rate for NOx in the low temperature region can be increased.

In the following, the present invention will be explained in more detail with reference to application examples and comparative examples. However, the present invention is not limited to the application examples.

Application Example 1

(Step 1) A prescribed quantity of platinum (Pt) was carried by impregnation on the cerium-doped alumina (Ce—$Al_2O_3$), followed by drying and sintering, forming a powder of Pt (3.9 wt %)/Ce—$Al_2O_3$.

(Step 2) A prescribed quantity of platinum (Pt) was carried by impregnation on the cerium-doped alumina (Ce—$Al_2O_3$), followed by drying and sintering, forming a powder of Pt (0.9 wt %)/Ce (1 wt %)—$Al_2O_3$.

(Step 3) A prescribed quantity of palladium (Pd) was carried by impregnation on the cerium-doped alumina (1 wt % of Ce—$Al_2O_3$ containing cerium in the $CeO_2$-equivalent quantity of 1 wt %, followed by drying and sintering, forming a powder of Pd (3 wt %)/Ce (1 wt %)—$Al_2O_3$.

(Step 4) A prescribed quantity of rhodium (Rh) was carried by impregnation on the lanthanum-doped zirconia (La—$ZrO_2$), followed by drying and sintering, forming a powder of Rh (2.2 wt %)/La—$ZrO_2$.

(Step 5) The powders prepared in the steps 1, 3 and 4 described above as well as boehmite alumina, nitric acid, and ion exchanged water were loaded in a magnetic pot, and, together with alumina balls, the contents were vibration pulverized, forming an outer layer slurry.

(Step 6) The powders prepared in the steps 2, 3 described above as well as boehmite alumina, nitric acid, and ion exchanged water were loaded in a magnetic pot, and, together with alumina balls, the contents were vibration pulverized, forming an inner layer slurry.

(Step 7) The inner layer slurry prepared in step 6 described above was loaded in a ceramic honeycomb carrier (cell number: 400 cells/6 mil, capacity: 0.119 L). The excessive slurry was removed by an air flow, followed by drying at 120° C.

(Step 8) The outer layer slurry prepared in step 5 described above was loaded to the carrier prepared in step 7 described above. The excessive slurry was removed by an air flow, followed by drying at 120° C. and the sintering at 400° C. in an air flow. In this case, the quantity of the catalyst noble metal in the catalyst was 6.7 g/L.

(Step 9) Barium (Ba) was carried by impregnation on the catalyst prepared in the step 8 described above so that the quantity of Ba became 28 g/L, followed by drying at 120° C. and then sintering at 400° C. in an air flow, forming the lean NOx trap type exhaust gas purifying catalyst.

For the lean NOx trap type exhaust gas purifying catalyst in this example, the content of cerium represented by the $CeO_2$-equivalent quantity with respect to the total quantity of the catalyst was 13.5 wt %.

Here, the cerium-doped alumina (1 wt % Ce—$Al_2O_3$) as an inorganic oxide carrying palladium was sintered at 900° C. for 3 h, and the surface area maintainability was 58%.

Application Example 2

The operation was carried out in the same way as in Application Example 1 to obtain the lean NOx trap type exhaust gas purifying catalyst of this example, except that instead of the cerium-doped alumina (1 wt % Ce—$Al_2O_3$) containing cerium in the CeO2-equivalent quantity of 1 wt % as the carrier for Pd in Application Example 1, the cerium-doped zirconia (1 wt % Ce—$ZrO_2$) containing cerium in the $CeO_2$-equivalent quantity of 1 wt % was adopted.

The lean NOx trap type exhaust gas purifying catalyst of this example contained cerium in the $CeO_2$-equivalent quantity with respect to the total quantity of the catalyst of 13.5 wt %.

The cerium-doped zirconia (1 wt % Ce—$ZrO_2$) as the inorganic oxide carrying palladium had a surface area maintainability of 67% after sintering at 900° C. for 3 h.

Application Example 3

The operation was carried out in the same way as in Application Example 1 to obtain the lean NOx trap type exhaust gas purifying catalyst of this example, except that instead of barium (Ba) adopted in Application Example 1, magnesium (Mg) was adopted as the NOx adsorbent.

The lean NOx trap type exhaust gas purifying catalyst of this example contained cerium in the $CeO_2$-equivalent quantity with respect to the total quantity of the catalyst of 13.5 wt %.

The cerium-doped alumina (1 wt % Ce—$Al_2O_3$) as the inorganic oxide carrying palladium had a surface area maintainability of 58% after sintering at 900° C. for 3 h.

Application Example 4

The operation was carried out in the same way as in Application Example 1 to obtain the lean NOx trap type exhaust gas purifying catalyst of this example, except that instead of barium (Ba) adopted in Application Example 1, sodium (Na) was adopted as the NOx adsorbent.

The lean NOx trap type exhaust gas purifying catalyst of this example contained cerium in the $CeO_2$-equivalent quantity with respect to the total quantity of the catalyst of 13.5 wt %.

The cerium-doped alumina (1 wt % Ce—$Al_2O_3$) as the inorganic oxide carrying palladium had a surface area maintainability of 58% after sintering at 900° C. for 3 h.

Application Example 5

The operation was carried out in the same way as in Application Example 1 to obtain the lean NOx trap type exhaust gas purifying catalyst of this example, except that instead of barium (Ba) adopted in Application Example 1, potassium (K) was adopted as the NOx adsorbent.

The lean NOx trap type exhaust gas purifying catalyst of this example contained cerium in the $CeO_2$-equivalent quantity with respect to the total quantity of the catalyst of 13.5 wt %.

The cerium-doped alumina (1 wt % Ce—$Al_2O_3$) as the inorganic oxide carrying palladium had a surface area maintainability of 58% after sintering at 900° C. for 3 h.

Application Example 6

The operation was carried out in the same way as in Application Example 1 to obtain the lean NOx trap type exhaust gas purifying catalyst of this example, except that instead of barium (Ba) adopted in Application Example 1, cesium (Cs) was adopted as the NOx adsorbent.

The lean NOx trap type exhaust gas purifying catalyst of this example contained cerium in the $CeO_2$-equivalent quantity with respect to the total quantity of the catalyst of 13.5 wt %.

The cerium-doped alumina (1 wt % $Ce—Al_2O_3$) as the inorganic oxide carrying palladium had a surface area maintainability of 58% after sintering at 900° C. for 3 h.

Application Example 7

The operation was carried out in the same way as in Application Example 1 to obtain the lean NOx trap type exhaust gas purifying catalyst of this example, except that instead of the cerium-doped alumina (1 wt % $Ce—Al_2O_3$) containing cerium in the $CeO_2$-equivalent quantity of 1 wt % adopted in Application Example 1, a cerium-doped alumina (5 wt % $Ce—Al_2O_3$) containing cerium in the $CeO_2$-equivalent quantity of 5 wt % was adopted as the carrier for Pd.

The lean NOx trap type exhaust gas purifying catalyst of this example contained cerium in the $CeO_2$-equivalent quantity with respect to the total quantity of the catalyst of 13.9 wt %.

The cerium-doped alumina (5 wt % $Ce—Al_2O_3$) as the inorganic oxide carrying palladium had a surface area maintainability of 62% after sintering at 900° C. for 3 h.

Application Example 8

The operation was carried out in the same way as in Application Example 2 to obtain the lean NOx trap type exhaust gas purifying catalyst of this example, except that instead of the cerium-doped zirconia (1 wt % $Ce—ZrO_2$) containing cerium in the $CeO_2$-equivalent quantity of 1 wt % adopted in Application Example 2, a cerium-doped zirconia (5 wt % $Ce—ZrO_2$) containing cerium in the $CeO_2$-equivalent quantity of 5 wt % was adopted as the carrier for Pd.

The lean NOx trap type exhaust gas purifying catalyst of this example contained cerium in the $CeO_2$-equivalent quantity with respect to the total quantity of the catalyst of 13.9 wt %.

The cerium-doped zirconia (5 wt % $Ce—ZrO_2$) as the inorganic oxide carrying palladium had a surface area maintainability of 78% after sintering at 900° C. for 3 h.

Application Example 9

The operation was carried out in the same way as in Application Example 1 to obtain the lean NOx trap type exhaust gas purifying catalyst of this example, except that instead of the cerium-doped alumina (1 wt % $Ce—Al_2O_3$) containing cerium in the $CeO_2$-equivalent quantity of 1 wt % adopted in Application Example 1, a cerium-doped alumina (20 wt % $Ce—Al_2O_3$) containing cerium in the $CeO_2$-equivalent quantity of 20 wt % was adopted as the carrier for Pd.

The lean NOx trap type exhaust gas purifying catalyst of this example contained cerium in the $CeO_2$-equivalent quantity with respect to the total quantity of the catalyst of 15.4 wt %.

The cerium-doped alumina (20 wt % $Ce—Al_2O_3$) as the inorganic oxide carrying palladium had a surface area maintainability of 68% after sintering at 900° C. for 3 h.

Application Example 10

The operation was carried out in the same way as in Application Example 2 to obtain the lean NOx trap type exhaust gas purifying catalyst of this example, except that instead of the cerium-doped zirconia (1 wt % $Ce—ZrO_2$) containing cerium in the $CeO_2$-equivalent quantity of 1 wt % adopted in Application Example 2, a cerium-doped zirconia (20 wt % $Ce—ZrO_2$) containing cerium in the $CeO_2$-equivalent quantity of 1 wt % was adopted as the carrier for Pd.

The lean NOx trap type exhaust gas purifying catalyst of this example contained cerium in the $CeO_2$-equivalent quantity with respect to the total quantity of the catalyst of 15.4 wt %. The cerium-doped zirconia (20 wt % $Ce—ZrO_2$) as the inorganic oxide carrying palladium had a surface area maintainability of 71% after sintering at 900° C. for 3 h.

Application Example 11

An exhaust gas cleaning system shown in FIG. 1 was constructed using the catalyst noble metal with quantity of 8.2 g/L (palladium/rhodium=11/1) as the oxidation catalytic converters for diesel engine, and using the lean NOx trap type exhaust gas purifying catalyst prepared in Application Example 1 as the exhaust gas purifying catalyst.

Application Example 12

An exhaust gas cleaning system shown in FIG. 1 was constructed using the catalyst noble metal with quantity of 4.2 g/L (palladium/rhodium=11/1) as the oxidation catalytic converters for diesel engine, and using the lean NOx trap type exhaust gas purifying catalyst prepared in Application Example 1 as the exhaust gas purifying catalyst

Application Example 13

An exhaust gas cleaning system shown in FIG. 1 was constructed using the catalyst noble metal with quantity of 2.1 g/L (palladium/rhodium=11/1) as the oxidation catalytic converters for diesel engine, and using the lean NOx trap type exhaust gas purifying catalyst prepared in Application Example 1 as the exhaust gas purifying catalyst

Comparative Example 1

The operation was carried out in the same way as in Application Example 1 to obtain the lean NOx trap type exhaust gas purifying catalyst of this example, except that instead of the cerium-doped alumina (1 wt % $Ce—Al_2O_3$) containing cerium in the $CeO_2$-equivalent quantity of 1 wt % adopted in Application Example 1, a cerium-doped alumina (60 wt % $Ce—Al_2O_3$) containing cerium in the $CeO_2$-equivalent quantity of 60 wt % was adopted as the carrier for Pd.

The lean NOx trap type exhaust gas purifying catalyst of this example contains cerium in the $CeO_2$-equivalent quantity with respect to the total quantity of the catalyst of 19.4 wt %.

The cerium-doped alumina (60 wt % $Ce—Al_2O_3$) as the inorganic oxide carrying palladium had a surface area maintainability of 55% after sintering at 900° C. for 3 h.

Comparative Example 2

The operation was carried out in the same way as in Application Example 2 to obtain the lean NOx trap type exhaust gas purifying catalyst of this example, except that instead of the cerium-doped zirconia (1 wt % Ce—$ZrO_2$) containing cerium in the $CeO_2$-equivalent quantity of 1 wt % adopted in Application Example 1, a cerium-doped zirconia (60 wt % Ce—$ZrO_2$) containing cerium in the $CeO_2$-equivalent quantity of 60 wt % was adopted as the carrier for Pd.

The lean NOx trap type exhaust gas purifying catalyst of this example contained cerium in the $CeO_2$-equivalent quantity with respect to the total quantity of the catalyst of 19.4 wt %.

The cerium-doped zirconia (60 wt % Ce—$ZrO_2$) as the inorganic oxide carrying palladium had a surface area maintainability of 74% after sintering at 900° C. for 3 h.

Comparative Example 3

The operation was carried out in the same way as in Application Example 1 to obtain the lean NOx trap type exhaust gas purifying catalyst of this example, except that instead of the cerium-doped alumina (1 wt % Ce—$Al_2O_3$) containing cerium in the $CeO_2$-equivalent quantity of 1 wt % adopted in Application Example 1, alumina ($Al_2O_3$) was adopted as the carrier for Pd.

The lean NOx trap type exhaust gas purifying catalyst of this example contained cerium in the $CeO_2$-equivalent quantity with respect to the total quantity of the catalyst of 13.4 wt %.

The alumina ($Al_2O_3$) as the inorganic oxide carrying palladium had a surface area maintainability of 23% after sintering at 900° C. for 3 h.

Comparative Example 4

The operation was carried out in the same way as in Application Example 2 to obtain the lean NOx trap type exhaust gas purifying catalyst of this example, except that instead of the cerium-doped zirconia (1 wt % Ce—$ZrO_2$) containing cerium in the $CeO_2$-equivalent quantity of 1 wt % adopted in Application Example 1, zirconia ($ZrO_2$) was adopted as the carrier for Pd.

The lean NOx trap type exhaust gas purifying catalyst of this example contained cerium in the $CeO_2$-equivalent quantity with respect to the total quantity of the catalyst of 13.4 wt %.

The zirconia ($ZrO_2$) as the inorganic oxide carrying palladium had a surface area maintainability of 18% after sintering at 900° C. for 3 h.

Table 1 lists a portion of the specifications of the lean NOx trap type exhaust gas purifying catalysts and exhaust gas cleaning systems prepared in the various examples. In Table 1, DOC represents the oxidation catalytic converters for diesel engine, and LNT represents the lean NOx trap type exhaust gas purifying catalytic converter.

TABLE 1

| | Quantity of catalyst noble metal in DOC (g/L) | Quantity of catalyst noble metal in LNT (g/L) | Type of noble metal | Type of carrier of Pd | Quantity of Ce in carrier of Pd (wt %) | Quantity of Ce in LNT (wt %) | Surface area maintainability of carrier of Pd (%) | Type of NOx adsorbent | NOx cleaning rate (%) | HC cleaning rate (%) |
|---|---|---|---|---|---|---|---|---|---|---|
| Application Example 1 | — | 6.7 | Pt, Pd, Rh | Ce—$Al_2O_3$ | 1 | 13.5 | 58 | Ba | 33.3 | — |
| Application Example 2 | — | 6.7 | Pt, Pd, Rh | Ce—$ZrO_2$ | 1 | 13.5 | 67 | Ba | 34.1 | — |
| Application Example 3 | — | 6.7 | Pt, Pd, Rh | Ce—$Al_2O_3$ | 1 | 13.5 | 58 | Mg | 31.1 | — |
| Application Example 4 | — | 6.7 | Pt, Pd, Rh | Ce—$Al_2O_3$ | 1 | 13.5 | 58 | Na | 32.0 | — |
| Application Example 5 | — | 6.7 | Pt, Pd, Rh | Ce—$Al_2O_3$ | 1 | 13.5 | 58 | K | 32.8 | — |
| Application Example 6 | — | 6.7 | Pt, Pd, Rh | Ce—$Al_2O_3$ | 1 | 13.5 | 58 | Cs | 33.6 | — |
| Application Example 7 | — | 6.7 | Pt, Pd, Rh | Ce—$Al_2O_3$ | 5 | 13.9 | 62 | Ba | 33.1 | — |
| Application Example 8 | — | 6.7 | Pt, Pd, Rh | Ce—$ZrO_2$ | 5 | 13.9 | 78 | Ba | 33.5 | — |
| Application Example 9 | — | 6.7 | Pt, Pd, Rh | Ce—$Al_2O_3$ | 20 | 15.4 | 68 | Ba | 32.2 | — |
| Application Example 10 | — | 6.7 | Pt, Pd, Rh | Ce—$ZrO_2$ | 20 | 15.4 | 71 | Ba | 32.8 | — |
| Application Example 11 | 8.2 | 6.7 | Pt, Pd, Rh | Ce—$Al_2O_3$ | 1 | 13.5 | 58 | Ba | 25.1 | 94.8 |
| Application Example 12 | 4.2 | 6.7 | Pt, Pd, Rh | Ce—$Al_2O_3$ | 1 | 13.5 | 58 | Ba | 33.9 | 91.6 |
| Application Example 13 | 2.1 | 6.7 | Pt, Pd, Rh | Ce—$Al_2O_3$ | 1 | 13.5 | 58 | Ba | 34.2 | 68.7 |
| Comparative Example 1 | — | 6.7 | Pt, Pd, Rh | Ce—$Al_2O_3$ | 60 | 19.4 | 55 | Ba | 30.3 | — |
| Comparative Example 2 | — | 6.7 | Pt, Pd, Rh | Ce—$ZrO_2$ | 60 | 19.4 | 74 | Ba | 30.8 | — |
| Comparative Example 3 | — | 6.7 | Pt, Pd, Rh | $Al_2O_3$ | 0 | 13.4 | 53 | Ba | 26.2 | — |
| Comparative Example 4 | — | 6.7 | Pt, Pd, Rh | $ZrO_2$ | 0 | 13.4 | 18 | Ba | 27.8 | — |

Evaluation of Performance

For the lean NOx trap type exhaust gas purifying catalytic converters and exhaust gas cleaning systems prepared in the examples, after treatment for endurance under the following conditions, the NOx cleaning rate (and also the HC cleaning rate for the exhaust gas cleaning system) was measured under the following listed conditions. Here, the gas flow rate was at 40 L/min. The obtained results are listed in Table 1.

Endurance Treatment Condition

Each lean NOx trap type exhaust gas purifying catalyst prepared in the examples was arranged behind the V-type 6-cylinder 3.5-L engine manufactured by Nissan Motor Co., Ltd., and the temperature at the inlet to the catalytic converter was adjusted to 750° C. Endurance treatment was carried out for 60 h in the exhaust gas atmosphere. Here, the lead-free gasoline was adopted as the fuel in the test.

[Evaluation of the NOx Cleaning Performance of the Lean NOx Trap Type Exhaust Gas Purifying Catalyst For the lean NOx trap type exhaust gas purifying catalyst prepared in each example, after cutting to have a capacity of 0.040 L, in a lab evaluation device, the gas type and concentration were adjusted to the gas conditions listed in Table 2, and the lean (60 sec)/rich (4 sec) swapping evaluation was carried out.

In this test, the evaluation temperature (catalyst inlet temperature) was set at 250° C.

The NOx cleaning rate was computed using the following listed formula (I).

TABLE 2

| | Gas concentration | |
|---|---|---|
| Gas type | Lean (60 sec) | Rich (4 sec) |
| NO | 300 ppm | 300 ppm |
| CO | 0% | 1.5% |
| $H_2$ | 0% | 0.5% |
| $O_2$ | 4.0% | 0% |
| $C_3H_6$ | 0% | 3000 ppmC |
| $CO_2$ | 9% | 9% |
| $H_2O$ | 10% | 10% |
| $N_2$ | Balance | Balance |

[Numeric 1]

$$\text{NOx cleaning rate (\%)} = \frac{[\text{Inlet NOx quantity (rich + lean)}] - [\text{outlet NOx quantity (rich + lean)}]}{[\text{inlet NOx quantity (rich + lean)}]} \times 100 \quad (I)$$

Evaluation of NO Cleaning Performance and HC Cleaning Performance of Exhaust Gas Cleaning System For each example, after cutting so that the capacity of the oxidation catalytic converters became 0.010 L and the capacity of the lean NOx trap type exhaust gas purifying catalyst became 0.040 L, the lab evaluation device shown in FIG. 1 was set up to carry out the lean (60 sec) and rich (4 sec) swapping evaluation as the gas type and concentration were adjusted to the gas conditions listed in Table 3.

In this case, the evaluation temperature (catalyst inlet temperature) was set at 250° C.

The HC cleaning rate was computed using the following listed formula (II), and the NOx cleaning rate was computed using the following listed formula (I).

TABLE 3

| | Gas concentration | |
|---|---|---|
| Gas type | Lean (60 sec) | Rich (4 sec) |
| NO | 300 ppm | 300 ppm |
| CO | 0% | 2.5% |
| $H_2$ | 0% | 0.5% |
| $O_2$ | 4.0% | 0% |
| $C_3H_6$ | 0% | 3000 ppmC |
| $CO_2$ | 9% | 9% |
| $H_2O$ | 10% | 10% |
| $N_2$ | Balance | Balance |

As can be seen from Table 1, the NOx cleaning rates after the endurance treatment of the lean NOx trap type exhaust gas purifying catalysts prepared in Application Examples 1 to 10 belonging to the range of the present invention are better than those of the lean NOx trap type exhaust gas purifying catalysts in Comparative Examples 1 to 4.

In addition, it can be seen that for the lean NOx trap type exhaust gas purifying catalysts prepared in Application Examples 1 to 10 and Comparative Examples 1 and 2, the surface area maintainability of the carrier for Pd is 50% or higher, and the NOx cleaning rates after the endurance treatment are better than those of the lean NOx trap type exhaust gas purifying catalysts prepared in Comparative Examples 3 and 4.

In addition, it can be seen that for the lean NOx trap type exhaust gas purifying catalysts prepared in Application Examples 1 to 10, the quantity of cerium represented by the $CeO_2$-equivalent quantity is 20 wt % or less, and the NOx cleaning rates are good.

As can be seen from Table 1, for the exhaust gas cleaning systems prepared in Application Examples 11 to 13 belonging to the range of the present invention, because they use the lean NOx trap type exhaust gas purifying catalysts with excellent NOx cleaning rates after endurance treatment, the NOx cleaning rate and HC cleaning rate after the endurance treatment are excellent.

In addition, it can be seen that from a comparison made for the exhaust gas cleaning systems of Application Examples 11 to 13, for the exhaust gas cleaning system in Application Example 12, in which the ratio of the quantity of the catalyst noble metal in the lean NOx trap type exhaust gas purifying catalyst to the quantity of the catalyst noble metal in the other catalyst is in the range of 1 to 1.6, the NOx cleaning rate and the HC cleaning rate after the endurance treatment is excellent.

The invention claimed is:

1. An exhaust gas cleaning system comprising:
    a lean NOx trap type exhaust gas purifying catalyst having a catalyst noble metal selected from a group consisting of platinum, palladium and rhodium, an inorganic oxide that carries the catalyst noble metal, and at least one NOx adsorbent one selected from a group of magnesium, barium, sodium, potassium and cesium, the inorganic oxide carrying palladium containing cerium in a CeO2-equivalent quantity in a range of 1 to 20 wt %, and at least one of aluminum and zirconium;
    a lean NOx trap type exhaust gas purifying catalytic converter containing a quantity of the lean NOx trap type exhaust gas purifying catalyst; and
    an additional catalytic converter containing a quantity of a catalyst noble metal and located on the upstream side from the lean NOx trap type exhaust gas purifying catalytic converter with respect to the exhaust gas flow direction,
    the quantity of the lean NOx trap type exhaust gas purifying catalyst in the lean NOx trap type exhaust gas puri-

[Numeric 2]

$$HC \text{ cleaning rate (\%)} = \frac{[HC \text{ quantity at } DOC \text{ catalytic converter inlet (rich + lean)}] - [HC \text{ quantity at } LNT \text{ catalytic converter outlet (rich + lean)}]}{[HC \text{ quantity at } DOC \text{ catalytic converter inlet (rich + lean)}]} \times 100 \quad (II)$$

fying catalytic converter to the quantity of the catalyst noble metal in the additional catalytic converter being in a ratio by mass in the range of 1 to 1.6.

2. The lean NOx trap type exhaust gas purifying catalyst according to claim 1, wherein
the NOx adsorbent is barium or cesium.

3. The lean NOx trap type exhaust gas purifying catalyst according to claim 2, wherein
the content of cerium represented by the CeO2-equivalent quantity with respect to the total quantity of the catalyst is 20 wt % or less.

4. The lean NOx trap type exhaust gas purifying catalyst according to claim 1, wherein
the content of cerium represented by the CeO2-equivalent quantity with respect to the total quantity of the catalyst is 20 wt % or less.

* * * * *